US006802067B1

(12) United States Patent
Camp et al.

(10) Patent No.: US 6,802,067 B1
(45) Date of Patent: Oct. 5, 2004

(54) COMPUTER SOFTWARE FRAMEWORK AND METHOD FOR LOGGING MESSAGES

(75) Inventors: Brandon Camp, Austin, TX (US); Kemi Ibitayo, Euless, TX (US); Philip Issa, Dallas, TX (US); Connie Xu, Irving, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 513 days.

(21) Appl. No.: 09/698,580

(22) Filed: Oct. 27, 2000

(51) Int. Cl.[7] .............................. G06F 3/00; G06F 9/44; G06F 9/46; G06F 13/00
(52) U.S. Cl. ........................ 719/315; 719/316; 719/318
(58) Field of Search ................................. 709/310–332; 719/315–318; 717/124–135

(56) References Cited

U.S. PATENT DOCUMENTS

| | | | | |
|---|---|---|---|---|
| 5,913,922 A | | 6/1999 | Dinnis et al. ................ | 709/300 |
| 6,122,675 A | * | 9/2000 | Fisher et al. ................ | 719/318 |
| 6,144,967 A | * | 11/2000 | Nock ....................... | 707/103 R |
| 6,349,333 B1 | * | 2/2002 | Panikatt et al. ............. | 709/223 |
| 6,470,388 B1 | * | 10/2002 | Niemi et al. ................ | 709/224 |

OTHER PUBLICATIONS

Nackman et al., Base–Class Composition with Multiple Derivation and Virtual Bases, USENIX Sixth C++ Techincal conference, Apr. 11–14, 1994, pp. 1–16.*
IBM, Log and Loggable Object Abstractions for Recovery Management, IBM Technical Disclosure Bulletin, Oct. 1995, vol. 38, pp. 87–88.*
Pattern 2: Message Logging Framework, Company: Athens Architectural Components, Internet Address: www.isaserv.com/technology/athens/Pattern2.html.

* cited by examiner

Primary Examiner—Meng-Al T. An
Assistant Examiner—Diem Cao

(57) ABSTRACT

The present invention discloses a message logging framework comprising a log object created by a destination log class extending a log base class and the log base class implementing a log interface. The log base class comprises a method for formatting a message and the destination log class comprises a method to log the formatted message to a destination log. In a preferred embodiment, the log base class further comprises a method for filtering the message by comparing a severity attribute of the message to a filter severity criterion. The present invention also discloses a message logging framework comprising a group log object created by a group log class extending a log collection class and implementing a log interface. The group log class comprises a method to log the message to a plurality of destination logs. The present invention further discloses a method for logging a message comprising forming a destination log object by a destination log class extending a log base class and the log base class implementing a log interface. A message is formatted, and the formatted message is logged to a destination log via the destination log object. In a preferred embodiment, the logging method further comprises filtering the message by comparing a severity attribute of the message to a filter severity criterion. The present invention also discloses a method for logging a message comprising forming a group log object by a group log class extending a log collection class and implementing a log interface. The message is logged to a plurality of destination logs via the group log object.

42 Claims, 6 Drawing Sheets

US 6,802,067 B1

COMPUTER SOFTWARE FRAMEWORK AND METHOD FOR LOGGING MESSAGES

BACKGROUND OF THE INVENTION

The present invention is a computer software framework and method that provides a means to log messages to files, consoles, databases, and other destinations and combines the functions of log file formatting, message multicasting, message filtering, message severity processing and log file management.

Message logging is an example of a general application facility that is typically needed in development of software code and applications to assist with testing, debugging, trouble shooting, and the like. Computer applications typically log (e.g., write, display, send, etc.) messages to a variety of destinations such as files, screens/user displays, dialogs, databases, remote servers, consoles, and the like using various message formats. An enterprise-wide computing system typically has a number of separate computing systems linked together and hosting a variety of computer applications, leading to problems such as inability of applications to log to multiple destinations simultaneously and inconsistent message formatting for messages written to the same log. Thus, a need exists for a means to uniformly log messages across an enterprise-wide computing system to aid in the development and maintenance thereof. The current invention addresses this need by encapsulating message logging and related functions, thereby providing a uniform application programming interface (API) to the various applications and making the task of message logging much simpler from an application's perspective. The invention abstracts the concept of a log, thereby presenting a consistent API to developers regardless of the log file type (e.g., a file log, a console log, a group log, etc.).

SUMMARY OF THE INVENTION

The present invention discloses a message logging framework, comprising a log object created by a destination log class extending a log base class and the log base class implementing a log interface, wherein the log base class comprises a method for formatting a message and the destination log class comprises a method to log the formatted message to a destination log. In a preferred embodiment, the log base class further comprises a method for filtering the message by comparing a severity attribute of the message to a filter severity criterion, wherein a message that conforms to the filter severity criterion becomes a filtered message and is (or alternatively is not) logged to the destination log and a message that does not conform to the filter severity criterion becomes an unfiltered message and is logged to the destination log. The present invention also discloses a message logging framework, comprising a group log object created by a group log class extending a log collection class and implementing a log interface, wherein the group log class comprises a method to log a message to a plurality of destination logs. In a preferred group logging embodiment, each of the plurality of destination logs further comprises a log object created by a destination log class extending a log base class and the log base class implementing a log interface, wherein the log base class comprises a method for formatting the message and the destination log class comprises a method to log the formatted message to the destination log.

The present invention further discloses a method for logging a message, comprising forming a destination log object by a destination log class extending a log base class and the log base class implementing a log interface; formatting the message; and logging the formatted message to a destination log via the destination log object. In a preferred embodiment, the logging method further comprises filtering the message by comparing a severity attribute of the message to a filter severity criterion, wherein a message that conforms to the filter severity criterion becomes a filtered message and is (or alternatively is not) logged to the destination log and a message that does not conform to the filter severity criterion becomes an unfiltered message and is logged to the destination log. The present invention also discloses a method for logging a message, comprising forming a group log object by a group log class extending a log collection class and implementing a log interface; and logging the message to a plurality of destination logs via the group log object. In a preferred group logging embodiment, the method further comprises forming a destination log object by a destination log class extending a log base class and the log base class implementing a log interface; formatting the message; and logging the formatted message to the destination log via the destination log object.

DETAILED DESCRIPTION OF THE INVENTION

The current invention provides a business computing component with a common interface to a variety of message logs such as a console log, a file log, and a group log. The invention provides a framework and method for logging messages to these various logs while maintaining a common interface for the existing business functions/applications being carried out by the business computing component. One of the advantages of the current invention is that it provides a single interface to perform message logging that would otherwise require two or more separate interfaces. In other words, the invention encapsulates the capabilities of multiple logs into a single interface.

Log as used herein means any type of message storage software device or medium, including datafiles, databases, memory chips, hard drives, floppy drives, magnetic storage media, optical storage media, and the like. Preferably, the log is a file or a database, which can be either a relational or object database. Message as used herein means any type or combination of data, information, words, symbols, signals, communications, strings, outputs, and the like generated by a computing system. Preferably, the message comprises a text string with one or more attributes attached to it such as a base severity level/description attribute and/or an options attribute containing information such as user identification, transaction type, application type, etc. Formatting a message means amending the text string of the message to remove information or to include additional information, for example by incorporating the information contained within a message attribute into the message text string. Preferably, the attributes are in the form of key/value pairs in a hashtable. Message logging is the act of sending a message to a log.

Figure 1A:
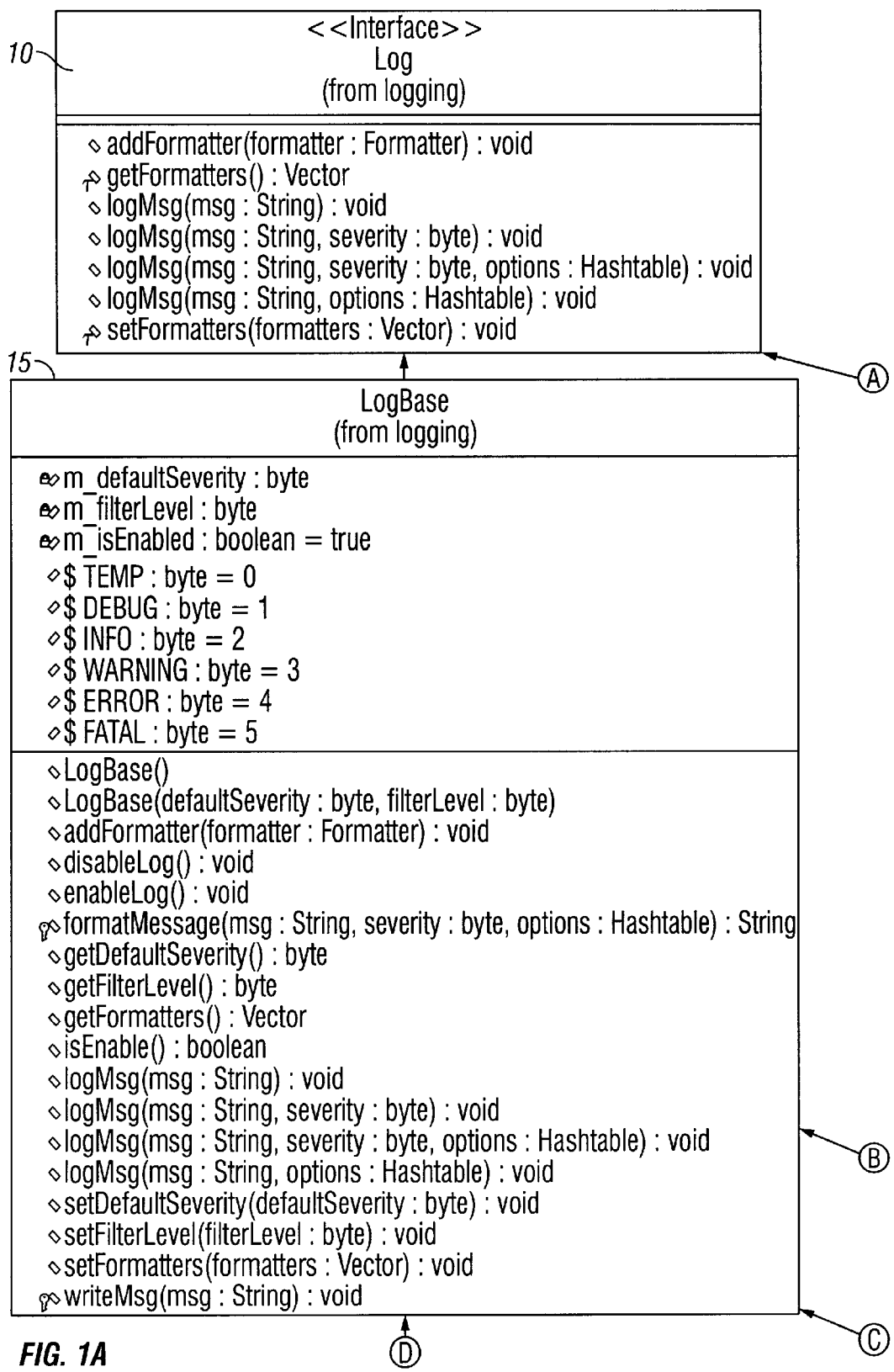
FIGS 1A–1D and 2A–2B are an object model, also referred to as a class diagram, of the message logging framework of this invention.

As shown in FIG. 1A, the public interface to the message logging framework is log interface 10 and log base class 15. An interface (also known as a message interface) is a communication surface that determines the signals (e.g., calls) that can pass through the surface; in other words, the interface defines which calls an object will respond to. Log base class 15 is an abstract class that implements log interface 10. The implementation of an object consists of a class definition that implements the object interface. As used in object technology, a class defines the methods and variables for a particular type of object; all objects of a given class are identical in form and behavior but contain different data in their variables. An abstract class is a class that contains one or more abstract methods (i.e., a method that has no implementation), and therefore can never be instantiated. Abstract classes contain useful information and methods and are defined so that other classes can extend them and make them concrete by implementing the abstract methods. Accessors are the methods on a class that provide access to the variables of the class (for example, get and set commands). The methods and variables comprising each class are shown in FIGS. 1A–1D, and it will be understood that these methods and variables may be modified by one skilled in the art without departing from the scope of the present invention. Log base class 15 provides the ability to enable or disable the logging function in addition to message filtering through severity levels and message formatting.

Figure 1B:
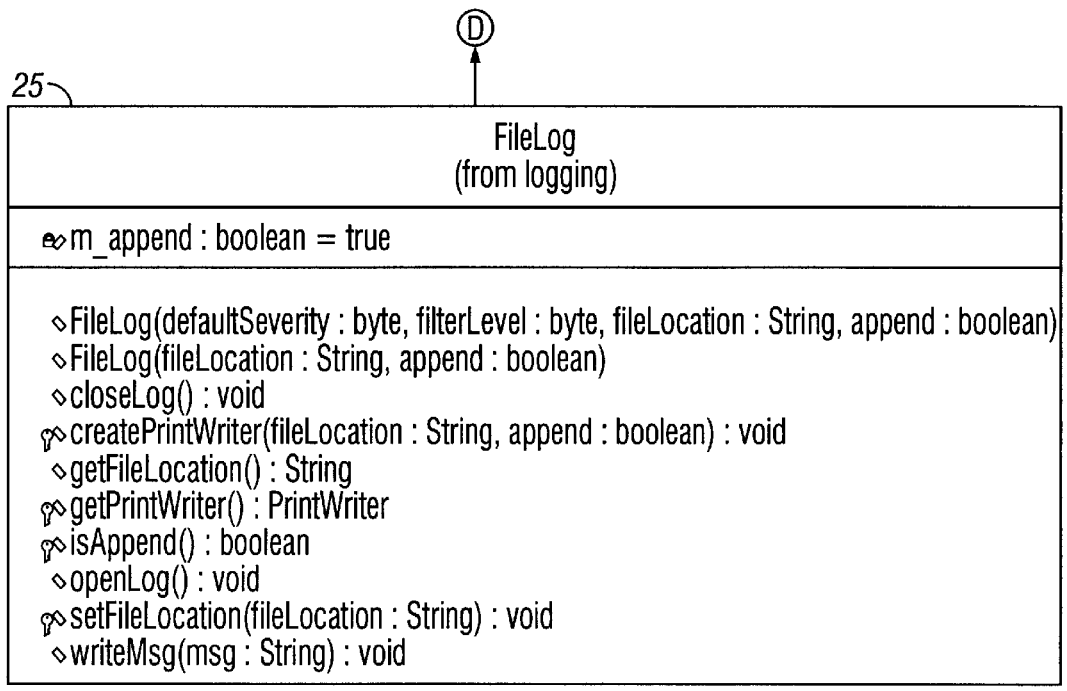
Figure 1C:
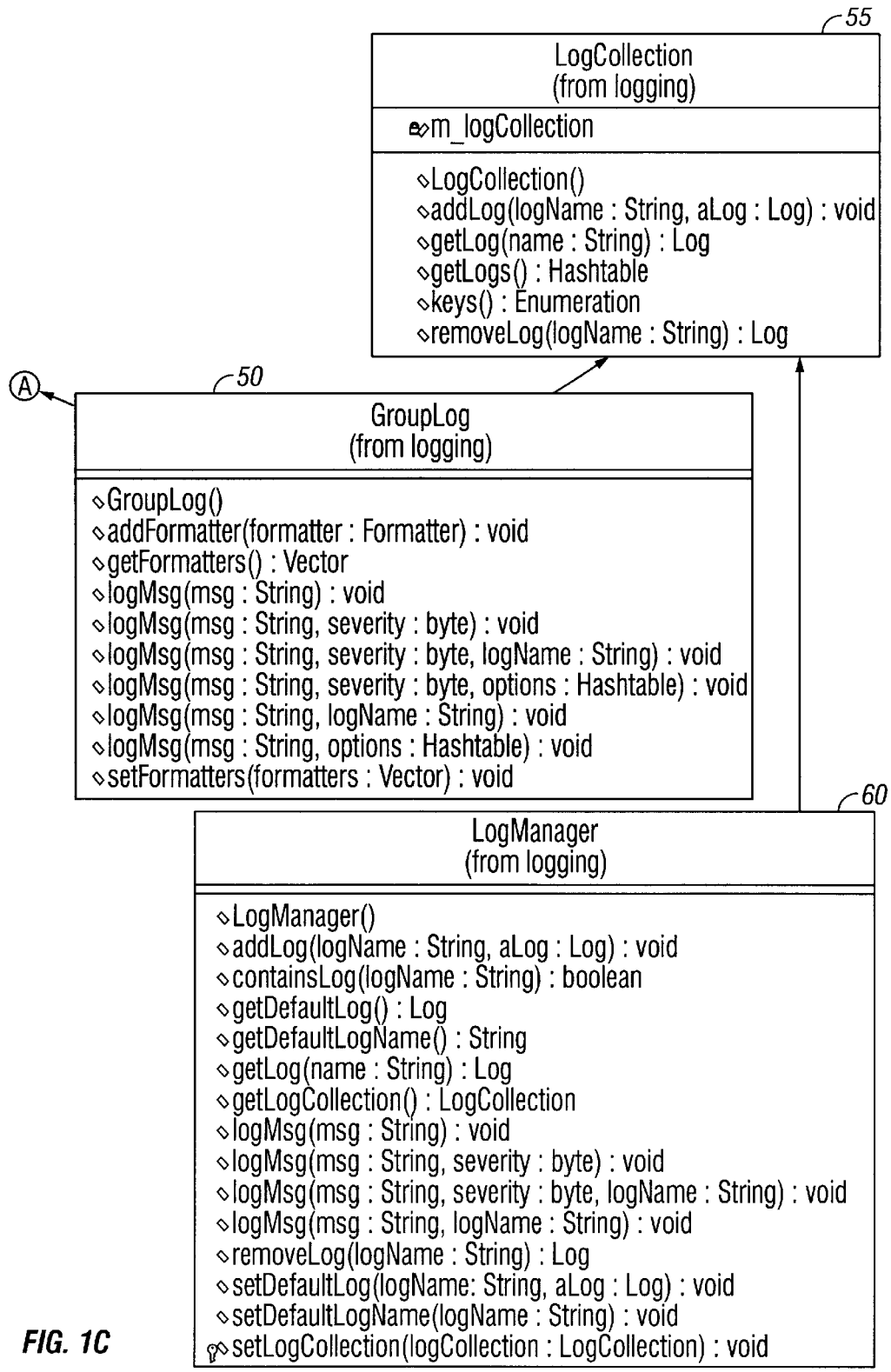
Figure 1D:
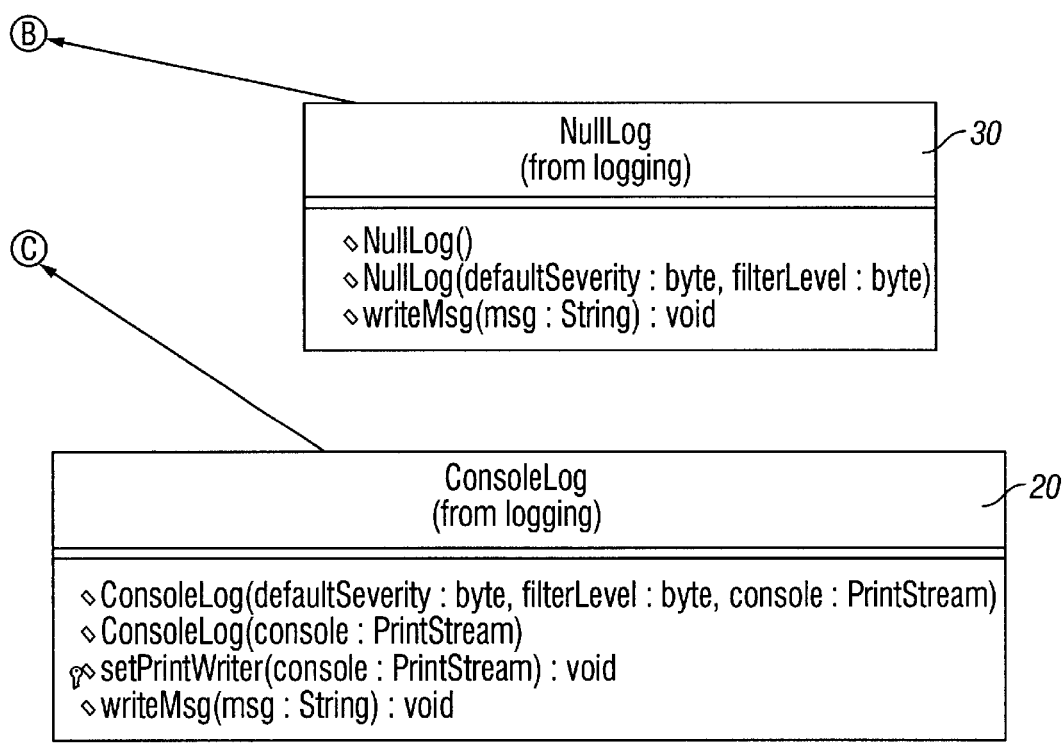

Console log class 20 in FIG. 1D, file log class 25 in FIG. 1B, and null log class 30 in FIG. 1D are classed representing specific types of logging destination (e.g., specific log types), each of which extends log base class 15. Thus, log base class 15 abstracts console log class 20, file log class 25, and null log class 30. Console log class 20 logs messages to a user console or display (referred to as standard out or standard error), file log class 25 logs messages to a file, and null log class 20 serves as a place holder and does not write a message to any location, which allows logging to be transparently disabled. Other specific logging destination classes may be added, for example logs associated with specific types of software or hardware such as a WebLogic server log, a remote CORBA or JMS logging server, or a database.

Log base class 15 provides a means to process messages based upon their severity attributes, for example through filtering or monitoring methods. Messages may be filtered based upon information contained in the severity attribute of the message. Filtering messages based upon their severity allows a developer to reduce the total number of messages being logged (i.e., reduce log file clutter), which is useful in reducing log storage requirements or focusing on critical or urgent types of messages. Furthermore, the severity attributes of messages can be monitored and used to trap and event and trigger other events. For example, if a high severity message is detected, a notification (such as an electronic page or e-mail) could be sent to a system administrator. Another example is to use the severity attributes as search indexes of the messages residing in a log. The severity attribute typically contains a description of the severity of the message, and this description can be appended into the message string during formatting, as discussed below. Following logging of the formatted message into a log, the severity portion of the logged message can then be used as a search index to find messages within the log. While any type of severity description could be used, the following is an exemplary listing of six descriptions, including both a severity level name and corresponding numerical indicator (i.e., levels 0 through 5, where 0 is the least severe and 5 is the most severe):

TEMP (0)—Temporary message used for quick testing or prototyping.
DEBUG (1)—Message used for debugging or testing.
INFO (2)—Indicates an informative message.
WARNING (3)—Indicates a warning message.
ERROR (4)—Indicates an error message that may be recoverable.
FATAL (5)—Indicates a fatal error message that is not recoverable.

Using these severity descriptions, messages may be filtered so that only messages meeting (or conversely, not meeting) the designated filter severity criterion of the filter will be logged. Filtering may be accomplished by any known means of comparing a message's severity level against the designated filter severity criterion. For example to log high severity level messages, the message is logged if the message's numerical severity level is greater than or equal to the filter's severity numerical level for the log. Message filtering may be used alone or in combination with the other logging functions described herein, and may be used on any type of log.

Figure 2A:
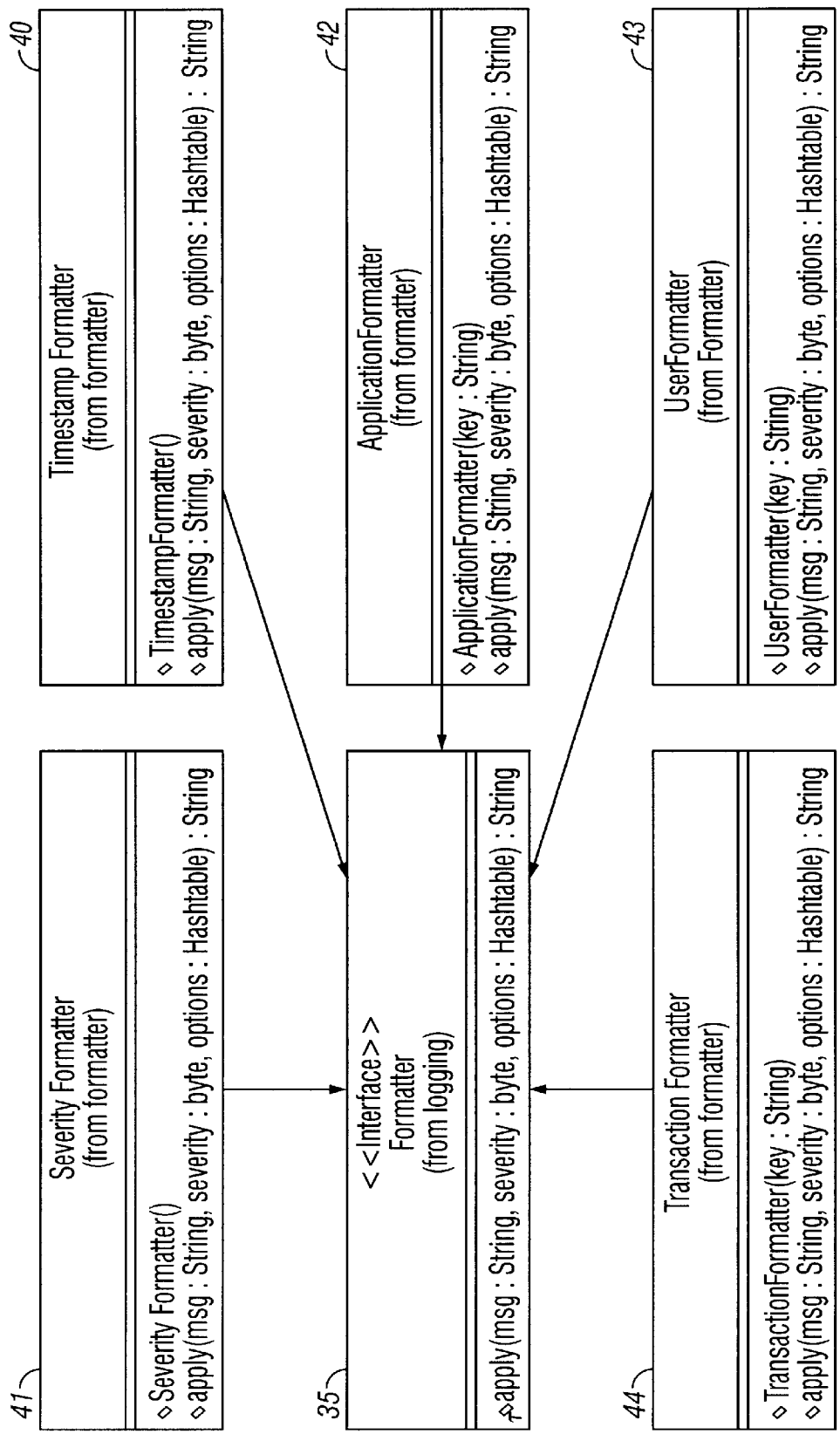

Log base class 15 provides a means to format messages to obtain a consistent structure and appearance for generated logs containing the logged messages, which helps to provide uniformity across a computing system. In carrying out the formatting function, log base class 15 calls a formatter, typically an object containing a method for appending additional information to the text string of the message. Referring to FIG. 2A, formatter subclasses implement formatter interface 35. Any type and number of formatter subclass may be used to represent information for amending a message prior to logging, and preferred formatter classes include time stamp formatter 40, severity formatter 41, application formatter 42, user formatter 43, and transaction formatter 44. Time stamp formatter 40 amends the text string of the message to include a time stamp (for example when the message is received). Severity formatter 41 amends the text string of the message to include the severity description contained in the severity attribute of the message. Likewise, application formatter 42, user formatter 43, and transaction formatter 44 amend the text string of the message to include identification of the application, user, and transaction, respectively. Any desirable type and number of formatters may be used such as a user identification formatter or application name formatter to identify to source of the message. In a preferred embodiment, the logging framework applies a chain of formatting operations to a log. The formatters are chained together such that when a message is sent to a log, the log iterates sequentially through its chain of formatters (typically in the order in which the formatters are added to the chain) and applies the formatting rules to the message before the message is displayed or written. Log file formatting may be used alone or in combination with the other logging functions described herein. Where messages are preformatted by the sender, it may not be necessary to format the message prior to logging the message.

Group log class in FIG. 1C provides a means to multicast messages to a plurality of logs, that is to write a message to multiple destinations. In other words, group log class 50 abstracts the underlying destination logs (such as console logs, file logs, etc.), thereby allowing an application to make a single logging call to the group log which results in the message being logged to each of the underlying destination logs. Group log class 50 may contain any number of destination logs, for example a collection containing a console log, a first file log, a second file log, etc. Group log class 50 implements log interface 10, and thus may be treated the same as any other log implementing log interface 10 (e.g., an implementation of console log class 20, file log class 25, or null log class 30). Group log class 50 extends log collection class 55 in FIG. 1C, which is an abstract class containing useful information and methods for creating and maintaining collections of logs (for example, methods to store and retrieve individual destination logs). Thus, group log 50 is a type of log collection. Message multicasting may be used alone or in combination with the other logging functions described herein.

Like group log class 50, log manager class 60 in FIG. 1C extends log collection class 55, and therefore log manager 60 is a type of log collection. More specifically, log manager class 60 is a collection of underlying destination logs (such as console logs, file logs, etc.) each of which has a logical name. As a helper or utility class, log manager class 60 provides access to the underlying destination logs by their logical names, which further promotes the efficient logging of messages.

Figure 2B:
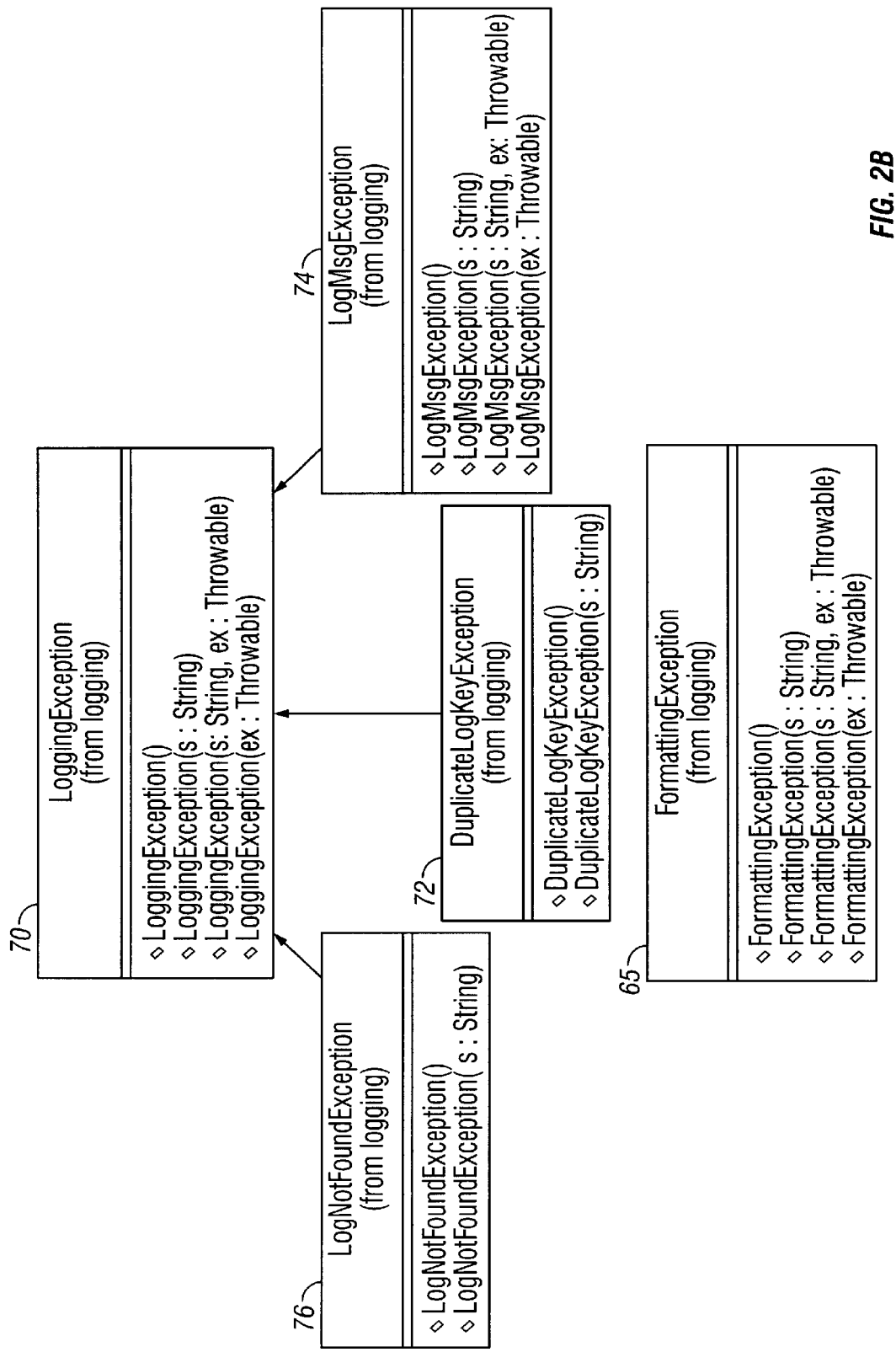

As shown in FIG. 2B, formatting exception class 65 and logging exception class 70 are standard error message classes (i.e., throwable exceptions) corresponding to common errors occurring in the formatting and logging functions, respectively. Duplicate log key exception class 72, log message exception class 74, and log not found exception class 76 are shown as representative members of logging exception class 70.

The present invention may be deployed at any architectural level requiring message logging capabilities within an enterprise wide computing system. In a preferred embodiment the messaging framework of the present invention is deployed on an application server, which may be any of a number of commercially available computer servers appropriate for accessing backend systems (e.g., databases, mainframes, customer premises equipment, and the like) to serve the needs of a client or group of clients (e.g., a user station, another server, etc.). A preferred application server is a WebLogic server available from BEA Systems.

EXAMPLES

While the code examples herein are written in the Java programming language, which is available from Sun Microsystems Inc., it is understood that other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples. The italicized text following the double backslashes (i.e., "//") is commentary text.

Example 1

Logging to the Console+Forang

In this example, a console log is created without specifying the default severity or filter level. In which case, the console log sets the default severity and filter level to the lowest level, TEMP. Since the filter level is set to the minimum value, all messages regardless of severity will be logged. Logging is performed directly through the instance of console log All log messages will have time stamps pre-pended to them by the time stamp formatter.

---

Source File: LogSample.java

```
import com.sprint.arch.logging.*;
import com.sprint.arch.logging.formatter.*;
public class LogSample {
public static void main(String[ ] args) {
    // Create a Console log without specifying any severity levels. The
    // log will use System.out to write messages to. The default severity
    // and filter level are set to LogBase.TEMP when not specified.
    ConsoleLog aConsoleLog = new ConsoleLog(System.out);
    // Create a TimestampFormatter and add it to the console log
    TimestampFormatter tsFormatter = new TimestampFormatter( );
    aConsoleLog.addFormatter(tsFormatter);
    // some code...
    // Something noteworthy occurred in the application, time to log it.
    try {
        // Log a message using the default severity of the console log.
        // The message is logged since the default severity is greater than
        // or equal to the filter level. (TEMP >= TEMP)
        aConsoleLog.logMsg("Something noteworthy happened!");
    }
    catch (LogMsgException e) {
        System.out.println(e);
    }
    return;
}
};
```

Console Output (Standard Out)

Sat Sep 16 11:23:36 CDT 2000:Something noteworthy happened!

---

Example 2

Logging to the Console+Optional Formatting

In this example, logging is performed directly to a console log which has been configured with a timestamp formatter, severity formatter, as well as a user formatter. The user formatter will check each call to log message for optional information in the options Hashtable. If the Hashtable contains a key of "userid" the formatter will format the logged string with the value of this field.

---

Source File: LogSample.java

```
import java.util.Hashtable;
import com.sprint.arch.logging.*;
import com.sprint.arch.logging.formatter.*;
public class LogSample {
public static void main(String[ ] args) {
    // Create a Console log without specifying any severity levels. The
    // log will use System.out to write messages to. The default severity
    // and filter level are set to LogBase.TEMP when not specified.
    ConsoleLog aConsoleLog = new ConsoleLog(System.out);
    // Create a user id formatter and add it to the console log
    aConsoleLog.addFormatter(new UserFormatter("userid"));
    // Create a Severity and add it to the console log
    aConsoleLog.addFormatter(new SeverityFormatter( ));
    // Create a TimestampFormatter and add it to the console log
    aConsoleLog.addFormatter(new TimestampFormatter( ));
    // some code...
    // Something noteworthy occurred in the application, time to log it.
    // Create a hashtable containing "optional" data including userid
    Hashtable options = new Hashtable( );
    try {
        // Log a message associated with no user id
        aConsoleLog.logMsg("Something noteworthy happened!",
        options);
        // Log a message associated with userid_A
        options.put("userid", "userid_A");
        aConsoleLog.logMsg("Something noteworthy happened!",
        options);
        //Log a message associated with userid_B
        options.put("userid", "userid_B");
        aConsoleLog.logMsg("Something noteworthy happened!",
        options);
        // Log a WARNING message associated with userid_C
        options.put("userid", "userid_C");
        aConsoleLog.logMsg("Something noteworthy happened!",
        LogBase.WARNING, options);
    }
    catch (LogMsgException e) {
        System.out.println(e);
    }
    return;
}
};
```

Console Output (Standard Out)

Mon Sep 18 13:08:31 CDT 2000:TEMP:userName:Something noteworthy happened!

-continued

Mon Sep 18 13:08:31 CDT 2000:TEMP:userid_A:Something noteworthy happened!
Mon Sep 18 13:08:31 CDT 2000:TEMP:userid_B:Something noteworthy happened!
Mon Sep 18 13:08:31 CDT 2000:WARNING:userid_C:Something noteworthy happened!

Example 3

Logging to the Console+Severity Filtering

In this example, a console log is created that will log all messages to standard error with the filter level set at LogBase.DEBUG. Three messages are then sent to the log. The first will not be logged, because it is sent with TEMP severity (TEMP<DEBUG). The second will be logged because it is sent with WARNING severity (WARNING>DEBUG). The third will not be logged because, although it is sent with WARNING severity, the log itself has been disabled.

Source File: LogSample.java

```
import com.sprint.arch.logging.*;
import com.sprint.arch.logging.formatter.*;
public class LogSample {
public static void main(String[ ] args) {
    // Create a Console log with default severity = TEMP, and filter
    level = TEMP
    // The log will use System.err to write messages to.
    ConsoleLog aConsoleLog = new ConsoleLog(LogBase.TEMP,
    LogBase.DEBUG, System.err);
    try {
        // Log a message using the a LogBase.TEMP severity. Message
        // is not logged since the msg severity is less than the
        // filter level. (TEMP < DEBUG)
        aConsoleLog.logMsg("This is a temporary message",
        LogBase.TEMP);
        // Log a message using the a LogBase.WARNING severity.
        // Message is logged since the msg severity is greater than or
        // equal to the filter level. (WARNING >= DEBUG)
        aConsoleLog.logMsg("This is a warning message",
        LogBase.WARNING);
        aConsoleLog.disableLog( );
        // more code
        // Log another warning. Message is not logged since the log is
        disabled.
        aConsoleLog.logMsg("Another warning, but log in disabled!",
        LogBase.WARNING);
    }
    catch (LogMsgException e) {
        System.out.println(e);
    }
    return;
}
};
```
Console Output (Standard Error).

This is a warning message

Example 4

Logging via a Group Log+Formatting

In this example, three logs are created: a file log, a console log, and a group log. The file and console logs are configured with formatters, and then are added to the group log. Logging of different severity levels is then performed directly to the group log. The correct output should show the log messages sent to both the file log and the console log, formatted accordingly.

Source File: LogSample.java

```
importjava.io.*;
import com.sprint.arch.logging.*;
import com.sprint.arch.logging.formatter.*;
public class LogSample {
public static void main(String[ ] args) {
    // Create a console log with default severity and filter level
    // which outputs to standard output
    ConsoleLog aConsoleLog = new ConsoleLog(System.out);
    // Create a file log with default severity and filter level
    // The /temp directoty must exist, and foo.log optionally exists.
    // The file log will append to the original contents of the file.
    FileLog aFileLog = null;
    try {
        aFileLog = new FileLog("/temp/foo.log", true);
    } catch (IOException e) {
        System.err.println(e);
    }
    // Create a TimestampFormatter and a SeverityFormatter and add to
    the file log
    aFileLog.addFormatter(new TimestampFormatter( ));
    aFileLog.addFormatter(new SeverityFormatter( ));
    // Add a TimestampFormatter to the console log
    aConsoleLog.addFormatter(new TimestampFormatter( ));
    // Create a group log and add both the file log and console log to it
    GroupLog aGroupLog = new GroupLog( );
    try {
        aGroupLog.addLog("console", aConsoleLog);
        aGroupLog.addLog("file", aFileLog);
    { catch (DuplicateLogKeyException e) {
        System.err.println(e);
    }
    {
    // Log multiple messages to the group log, each with a different
    severity
    try {
        aGroupLog.logMsg("Logging a temp message!",
        LogBase.TEMP);
        aGroupLog.logMsg("Logging a debug message!",
        LogBase.DEBUG);
        aGroupLog.logMsg("Logging an info message!",
        LogBase.INFO);
        aGroupLog.logMsg("Logging a warning message!",
        LogBase.WARNING);
        aGroupLog.logMsg("Logging an error message!",
        LogBase.ERROR);
        aGroupLog.logMsg("Logging a fatal message!",
        LogBase.FATAL);
    }
    catch (LogMsgException e) {
        System.err.println(e);
    }
    return;
}
};
```
Console Output (Standard Out)

Sun Sep 17 12:43:22 CDT 2000:Logging a temp message!
Sun Sep 17 12:43:22 CDT 2000:Logging a debug message!
Sun Sep 17 12:43:22 CDT 2000:Logging an info message!
Sun Sep 17 12:43:22 CDT 2000:Logging a warning message!
Sun Sep 17 12:43:22 CDT 2000:Logging an error message!
Sun Sep 17 12:43:22 CDT 2000:Logging a fatal message!
File Output (/temp/foo.log)

TEMP:Sun Sep 17 12:43:22 CDT 2000:Logging a temp message!
DEBUG:Sun Sep 17 12:43:22 CDT 2000:Logging a debug message!
INFO:Sun Sep 17 12:43:22 CDT 2000:Logging an info message!
WARNING:Sun Sep 17 12:43:22 CDT 2000:Logging a warning message!
ERROR:Sun Sep 17 12:43:22 CDT 2000:Logging an error message!
FATAL ERROR:Sun Sep 17 12:43:22 CDT 2000:Logging a fatal message!

Example 5

Logging via a LogManager

In this example, messages are logged via a LogManager. A console log and a file log are created and added to a LogManager with their own logical names. The console log is added as the default log. Once added messages are logged via the log manager and the logs logical name. A message is also logged without specifying a logical log name, therefore being sent to the default log.

Source File: LogSample.java

```
importjava.io.*;
import com.sprint.arch.logging.*;
import com.sprint.arch.logging.formatter.*;
public class LogSample {
public static void main(String[ ] args) {
    // Create a console log with default severity and filter level
    // which outputs to standard output
    ConsoleLog aConsoleLog = new ConsoleLog(System.out);
    // Create a file log with default severity and filter level
    // The /temp directory must exist, and foo.log optionally exists.
    // The file log will append to the original contents of the file.
    FileLog aFileLog = null;
    try {
        aFileLog = new FileLog("/temp/foo.log", true);
    } catch (IOException e) {
            System.err.println(e);
    }
    // Create a TimestampFormatter and a SeverityFormatter and add to
    the file log
    aFileLog:addFormatter(new SeverityFormatter( ));
    aFileLog.addFormatter(new TimestampFormatter( ));
    // Add a TimestampFormatter to the console log
    aConsoleLog.addFormatter(new TimestampFormatter( ));
    // Create a log manager and add both the file log and console log to it
    LogManager aLogManager = new LogManager( );
    try {
        aLogManager.setDefaultLog("console",aConsoleLog);
        aLogManager.addLog("file", aFileLog);
    } catch (DuplicateLogKeyException e) {
        System.err.println(e);
    }
    // Log multiple messages to different logs via the log manager
    try {
        // log to the log manager's default log
        aLogManager.logMsg("Logging a message with default
        severity!");
        // log to named logs
        aLogManager.logMsg("Logging a message with default
        severity!", "console");
        aLogManager.logMsg("Logging a message wtth default
        severity!", "file");
        // log to named logs with non-default severities
        aLogManager.logMsg("Logging a warning message!",
        LogBase.WARNING, "console");
        aLogManager.logMsg("Logging a error message!",
        LogBase.ERROR, console");
        aLogManager.logMsg("Logging a fatal message!",
        LogBase.FATAL, "file");
    }
    catch (LogNotFoundException e) {
        System.err.println(e);
    }
    catch (LogMsgException e) {
        System.err.println(e);
    }
    return;
}
};
```

Console Output (Standard Out)

Sun Sep 17 12:38:32 CDT 2000:Logging a message with default severity!
Sun Sep 17 12:38:32 CDT 2000:Logging a message with default severity!
Sun Sep 17 12:38:32 CDT 2000:Logging a warning message!
Sun Sep 17 12:38:32 CDT 2000:Logging a error message!

-continued

File Output (/temp/foo.log)

Sun Sep 17 12:38:32 CDT 2000:TEMP:Logging a message with default severity!
Sun Sep 17 12:38:32 CDT 2000:FATAL ERROR:Logging a fatal message!

Example 6

Log Abstraction

This method shows how specific log destination types can be passed and manipulated using their higher-level log interface type. In this example, an instance of a class named SomeOtherClass containing a log member variable and a trigger( ) method is instantiated. SomeOtherClass is representative of classes from other frameworks or application code that intend on integrating and utilizing the Logging Framework. The log member variable is initialized to a NutlLog. The triggers( ) represents a method that would normally perform logging operations to the log member. The main method creates and instance of SomeOtherClass and calls its triggers( ) method. It then replaces the instance's log with other types of logs, and calls the trigger method again each time, showing how the log can be transparently replaced.

Source File: SomeOtherClass.java

```
import com.sprint.arch.logging.Log;
import com.sprint.arch.logging.NullLog;
import com.sprint.arch.logging.LogMsgException;
public class SomeOtherClass {
private Log log = new NullLog( );
private static int i = 0;
public void trigger( ) {
    // do things related to this class
    // ...
    try {
        // log message to the log
        getLog( ).logMsg("Logging message #", +i++);
    } catch (LogMsgException e) {
        System.err.println(e);
    }
    // do more things related to this class
    return;
}
// mutator for private log instance
public void setLog(Log aLog) { this.log = aLog; }
// accessor for private log instance
public Log getLog( ) { return this.log; }
};
```

SourceFile: LogSample.java

```
importjava.io.*:
import SomeOtherClass;
import com.spint.arch.logging.*;
import com.sprint.arch.logging.formatter.*;
public class LogSample {
public static void main(String[ ] args) {
    // Create a console log with default severity and filter level
    // which outputs to standard output
    ConsoleLog aConsoleLog = new ConsoleLog(System.out);
    // Create a file log with default severity and filter level
    // The /temp directory must exist, and foo.log optionally exists.
    // The file log will append to the original contents of the file.
    FileLog aFileLog = null;
    try {
        aFileLog = new FileLog("/temp/foo.log", true);
    } catch (IOException e) {
            System.err.println(e);
```

-continued

```
}
// Create a TimestampFormatter and a SeverityFormatter and add to
the file log
aFileLog.addFormatter(new TimestampFormatter( ));
aFileLog.addFormatter(new SeverityFormatter( ));
// Add a TimestampFormatter to the console log
aConsoleLog.addFormatter(new TimestampFormatter( ));
// Create an instance of a class
SomeOtherClass anInstance = new SomeOtherClass( );
// trigger the instance to do whatever it does (including logging)
anInstance.trigger( );
// change the log in the instance and trigger it again
anInstance.setLog(aConsoleLog);
anInstance.trigger( );
// change the log in the instance again and trigger it again
anInstance.setLog(aFileLog);
anInstance.trigger( );
// change the log in the instance again and trigger it again
anInstance.setLog(new NullLog( ));
anInstance.trigger( );
// change the log in the instance and trigger it again
anInstance.setLog(aConsoleLog);
anInstance.trigger( );
return;
}
}
};
Console Output (Standard Out)

Mon Sep 18 12:48:12 CDT 2000:Logging message #1
Mon Sep 18 12:48:12 CDT 2000:Logging message #4
File Output (/temp/foo.log)

TEMP:Mon Sep 18 12:48:12 CDT 2000:Logging message #2
```

What is claimed is:

1. A message logging framework, comprising:
a log object created by a destination log class extending a log base class and the log base class implementing a log interface, wherein the log base class comprises a method for formatting a message and the destination log class comprises a method to log the formatted message to a destination log, wherein the message logging framework provides from an application's perspective a common interface to variety of destination logs distributed across a computing system thru the log object.

2. The framework of claim 1 wherein the message comprises a text string, a severity attribute, and an options attribute.

3. The framework of claim 2 wherein the method of formatting the message includes inserting a severity description into the message text siring, the severity description corresponding to the information contained in the message severity attribute.

4. The framework of claim 2 wherein the log base class further comprises:
a method for filtering the message by comparing the severity attribute of the message to a filter severity criterion, wherein a message that conforms to the filter severity criterion becomes a filtered message and is not logged to the destination log and a message that does not conform to the filter severity criterion becomes an unfiltered message and is logged to the destination log.

5. The framework of claim 2 wherein the log base class further comprises:
a method for filtering the message by comparing the severity attribute of the message to a filter severity criterion, wherein a message that conforms to the filter severity criterion becomes a filtered message and is logged to the destination log and a message that does not conform to the filter severity criterion becomes an unfiltered message and is not logged to the destination log.

6. The framework of claim 1 wherein the destination log class further comprises at least one destination log.

7. The framework of claim 1 wherein the destination log class further comprises a plurality of destination logs.

8. The framework of claim 1 wherein the method for formatting the message further comprises calling a formatter object, the formatting object further comprising a method to format tho message.

9. The framework of claim 8 wherein the formatter object further comprises a plurality of formatter objects chained together, each formatter object comprising a method to format the message.

10. The framework of claim 1 wherein the method for formatting the message includes inserting a time stamp.

11. The framework of claim 1 wherein the method for formatting the message includes inserting a severity description.

12. A message logging framework providing from an application's perspective a common interface to a variety of destination logs distributed across a computing system, comprising:
a group log object created by a group log class extending a log collection class and implementing a log interface, wherein the group log class comprises a method to log a message to a plurality of destination logs, thereby allowing the application to make a single logging call to the variety of destination logs thru the group log object.

13. The framework of claim 12 wherein each of the plurality of destination logs further comprises a log object created by a destination log class extending a log base class and the log base class implementing a log interface, wherein the log base class comprises a method for formatting the message and the destination log class comprises a method to log the formatted message to the destination log.

14. The framework of claim 13 wherein the message comprises a text string, a severity attribute, and an options attribute.

15. The framework of claim 14 wherein the method of formatting the message includes inserting a severity description into the message text string, the severity description corresponding to the information contained in the message severity attribute.

16. The framework of claim 14 wherein the log base class further comprises:
a method for filtering the message by comparing the severity attribute of the message to a filter severity criterion, wherein a message that conforms to the filter severity criterion becomes a filtered message and is not logged to the destination log and a message that does not conform to the filter severity criterion becomes an unfiltered message and is logged to the destination log.

17. The framework of claim 14 wherein the log base class further comprises:
a method for filtering the message by comparing the severity attribute of the message to a filter severity criterion, wherein a message that conforms to the filter severity criterion becomes a filtered message and is logged to the destination log and a message that does not conform to the filter severity criterion becomes an unfiltered message and is not logged to the destination log.

18. The framework of claim 13 wherein the method for formatting the message further comprising calling a formatter object, the formatter object further comprising a method to format the message.

19. The framework of claim 18 wherein the formatter object further comprises a plurality of formatter objects chained together, each formatter object comprising a method to format the message.

20. The framework of claim 13 wherein the method for formatting the message includes inserting a time stamp.

21. The framework of claim 13 wherein the method for formatting the message includes inserting a severity description.

22. A method for logging a message provided by a message logging framework, comprising:

forming a destination log object by a destination log class extending a log base class and the log base class implementing a log interface;

formatting the message; and logging the formatted message to a destination log via the destination log object, wherein the method provides from an application's perspective a common interface to a variety of destination logs distributed across a computing system thru the destination log object.

23. The method of claim 22 wherein the message comprises a text string, a severity attribute, and an options attribute.

24. The framework of claim 23 wherein the method of formatting the message includes inserting a severity description into the message text string, the severity description corresponding to the information contained in the message severity attribute.

25. The method of claim 23 further comprising:

filtering the message by comparing the severity attribute of the message to a filter severity criterion, wherein a message that conforms to the filter severity criterion becomes a filtered message and is not logged to the destination log and a message that does not conform to the filter severity criterion becomes an unfiltered message and is logged to the destination log.

26. The method of claim 23 further comprising:

filtering the message by comparing the severity attribute of the message to a filter severity criterion, wherein a message that conforms to the filter severity criterion becomes a filtered message and is logged to the destination log and a message that does not conform to the filter severity criterion becomes an unfiltered message and is not logged to the destination log.

27. The method of claim 22 wherein the destination log class further comprises at least one destination log.

28. The method of claim 22 wherein the destination log class further comprises a plurality of destination logs.

29. The method of claim 22 wherein the step of formatting the message further comprises calling a formatter object, the formatter object further comprising a method to format the message.

30. The method of claim 29 wherein the formatter object further comprises a plurality of formatter objects chained together, each formatter object comprising a method to format the message.

31. The method of claim 22 wherein the step of formatting the message comprises inserting a time stamp.

32. The method of claim 22 wherein the step of formatting the message comprises inserting a severity description.

33. A method for logging a message by providing from an application's perspective a common interface to a variety of destination logs distributed across a computing system, comprising:

forming a group log object by a group log class extending a log collection class and implementing a log interface; and logging the message to plurality of destination logs via the group log object, thereby allowing the application to make a single logging call to the variety of destination logs to log a message.

34. The method of claim 33 further comprising:

forming a destination log object by a destination log class extending a log base class and the log base class implementing a log interface, formatting the message; and logging the formatted message to the destination log via the destination log object.

35. The method of claim 34 wherein the step of formatting the message comprises inserting a time stamp.

36. The method of claim 34 wherein the step of formatting the message comprises inserting a severity description.

37. The method of claim 34 wherein the message comprises a text string, a severity attribute, and an options attribute.

38. The framework of claim 37 wherein the step of formatting the message includes inserting a severity description into the message text string, the severity description corresponding to the information contained in the message severity attribute.

39. The method of claim 37 further comprising:

filtering the message by comparing the severity attribute of the message to u filter severity criterion, wherein a message that conforms to the filter severity criterion becomes a filtered message and is not logged to the destination log and a message that does not conform to the filter severity criterion becomes an unfiltered message and is logged to the destination log.

40. The method of claim 37 further comprising:

filtering the message by comparing the severity attribute of the message to a filter severity criterion, wherein a message that conforms to the filter severity criterion becomes a filtered message and is logged to the destination log and a message that does not conform to the filter severity criterion becomes an unfiltered message and is not logged to the destination log.

41. The method of claim 34 wherein the step of formatting the message further comprises calling a formatter object, the formatter object further comprising a method to format the message.

42. The method of claim 41 wherein the formatter object further comprises a plurality of formatter objects chained together, each formatter object comprising a method to format the message.

* * * * *

UNITED STATES PATENT AND TRADEMARK OFFICE
CERTIFICATE OF CORRECTION

PATENT NO. : 6,802,067 B1
DATED : October 5, 2004
INVENTOR(S) : Camp et al.

It is certified that error appears in the above-identified patent and that said Letters Patent is hereby corrected as shown below:

Column 11,
Line 47, replace "siring" by -- string --

Column 12,
Line 8, replace "tho" by -- the --

Column 14,
Line 33, replace "to u" by -- to a --

Signed and Sealed this

Eighth Day of March, 2005

JON W. DUDAS
*Director of the United States Patent and Trademark Office*